(12) United States Patent
Schoenfelder et al.

(10) Patent No.: US 8,525,988 B2
(45) Date of Patent: Sep. 3, 2013

(54) MINIATURIZED CONFOCAL SPECTROMETER

(75) Inventors: Sven Schoenfelder, Lowenstein (DE); Andreas Bablich, Siegen (DE); Dirk Baxmann, Haltern (DE); Robert James Kennedy, Werl (DE)

(73) Assignee: Boehringer Ingelheim microParts GmbH, Dortmund (DE)

( * ) Notice: Subject to any disclaimer, the term of this patent is extended or adjusted under 35 U.S.C. 154(b) by 407 days.

(21) Appl. No.: 12/779,368

(22) Filed: May 13, 2010

(65) Prior Publication Data

US 2011/0037978 A1   Feb. 17, 2011

(30) Foreign Application Priority Data

May 16, 2009   (DE) .......................... 10 2009 021 637

(51) Int. Cl.
*G01J 3/28*   (2006.01)
(52) U.S. Cl.
USPC .......................................... 356/326; 356/301

(58) Field of Classification Search
USPC .................................................. 356/301, 326
See application file for complete search history.

(56) References Cited

U.S. PATENT DOCUMENTS

| | | | |
|---|---|---|---|
| 6,373,567 B1 * | 4/2002 | Wise et al. | 356/301 |
| 7,636,157 B2 * | 12/2009 | Wang et al. | 356/301 |
| 7,952,706 B2 * | 5/2011 | Ling et al. | 356/301 |
| 2010/0290042 A1 * | 11/2010 | Vakhshoori et al. | 356/301 |

* cited by examiner

*Primary Examiner* — Layla Lauchman
(74) *Attorney, Agent, or Firm* — Michael P. Morris; Wendy A. Petka

(57) ABSTRACT

The invention relates to a miniaturized spectrometer for investigating the spectrum of emission radiation excited in an object by incident radiation. For the miniaturized spectrometer according to the invention, a diode laser is preferably used as an edge emitter (without a perforated shutter). The window of the edge emitter is arranged at the focal point of the converging lens at the input of the illuminating beam path (without an optical fiber), preferably without a perforated shutter. The edge emitter produces a divergent beam pencil with an elliptical cross-section. The length ratio of the main axes of the ellipse is more than 2:1. The large main axis of the ellipse runs parallel to the longitudinal axis of the entry slit of the microspectrometer.

19 Claims, 2 Drawing Sheets

MINIATURIZED CONFOCAL SPECTROMETER

FIELD OF THE INVENTION

The invention relates to a miniaturized confocal spectrometer with integrated illuminating device for radiation emitted by an optically active object.

BACKGROUND OF THE INVENTION

In confocal optical equipment such as microscopes and spectrometers, the focal point of the illuminating beam path at the output end is located in the focal point of the imaging or detection beam path at the input end. The optical axis of this beam path may coincide with the axis of the illuminating beam path or the two axes may be inclined to one another.

Miniaturized equipment with a confocal arrangement of the illuminating beam path and the detecting beam path are known. Generally the illuminating beam path comprises a light source, a perforated shutter, a collimator, a band pass filter, a dichroic beam splitter and a converging lens. The perforated shutter is located in the focal point of the collimator on the input side. The converging lens images the perforated shutter in the focal point of the illuminating beam path on the output side. The focal point is located on or in the object that is to be examined. The axis of the dichroic beam splitter is tilted relative to the axis of the illuminating beam path.

The detecting beam path starts at the focal point of the converging lens on the output side (confocal imaging). The optical axis of the detecting beam path passes first through the collecting lens at the end of the illuminating beam path; this axis is deflected at the dichroic beam splitter out of the optical axis of the illuminating beam path. The detecting beam path may optionally contain a deflecting mirror. The detecting beam path comprises an edge filter and a collecting lens which collects the light at its focal point on the output side.

If a white or spectrally unclean monochromatic light source is used, the wavelength range which is suitable for exciting the emitted radiation is filtered out using the band pass filter. With the dichroic beam splitter, the light emitted by an object that is to be examined and which is located at the focal point of the illuminating beam path, together with any illuminating light sent back, is deflected. Depending on the nature of the use of the miniaturized spectrometer the edge filter (long pass or short pass filter) is used to filter out the suitable wavelength range in which the wavelength of the radiation emitted by the object that is to be examined is located.

The magnitude of the light source and its heat development require a certain distance between the light source and the miniaturized spectrometer. This distance is generally bridged by an optical fibre. The light is preferably supplied through this optical fibre, the end of which is located at the focal point of the collimator at the entrance to the illuminating beam path.

The light emanating from an illuminated object is preferably supplied from the detection beam path through another optical fibre to the entry slit of the spectrometer. The beginning of the additional optical fibre is located at the focal point of the converging lens at the output from the detecting beam path.

In the spectrometer the spectrum of the radiation emitted by an illuminated object is generated. The spectrum can be visually viewed on a monitor or it can be evaluated and displayed electronically.

DE 100 10 514 (STEAG microparts and Forschungszentrum Karlsruhe) describes an opto-electronic microspectrometer as a hybrid integrated functional unit. The microspectrometer contains an entry slit, a planar waveguide for the incident light and for the spectrally decomposed light, a self-focusing reflection grating and other functional optical elements. The spectrally decomposed light falls on a line of diodes from which the spectrum is supplied to an evaluating unit.

The problem thus arises of providing a miniaturized confocal spectrometer which is significantly smaller than known miniaturized spectrometers and which is as compact as possible in construction. The miniaturized spectrometer should not require any subsequent adjustment by the user. The miniaturized spectrometer should also be suitable for examining objects which contain a small concentration of the substance that is to be detected (molecules or atoms) which will tolerate only a very small dose of radiation or which are sensitive to heat. In addition it should be mobile and capable of being used under extreme conditions and suitable for use by untrained people.

SUMMARY OF THE INVENTION

The object of the invention is to increase the sensitivity achieved hitherto with known miniaturized spectrometers and to broaden the scope of use of spectrometers of this kind for low-intensity radiation sources, such as for example, for backwards scattering objects with light-induced emission spectrum such as Raman scattering or fluorescence radiation of molecules or atoms, even if the quantity of substance available is in the microgram or nanogram range.

The miniaturized confocal spectrometer according to the invention for the spectral examination of radiation emitted by an optically active object comprises the following components:

a light source the radiation of which is directed onto an object to be examined, and excites the emission radiation there; and an illuminating beam path which is coupled to a detecting beam path; the focal point of the illuminating beam path at the output end is identical to the focal point of the detecting beam path at the input end (confocal arrangement); and a known microspectrometer as one of the components of the miniaturized confocal spectrometer.

In one embodiment, the miniaturized confocal spectrometer, comprising a light source, an illuminating beam path having a converging lens at its input and output, a detecting beam path having a converging lens at its input and output, a dichroic beam splitter through which radiation emitted from the object is deflected from the illuminating beam path into the detecting beam path, and a microspectrometer having an entry slit and a viewing device for the spectrum of the radiation emitted by the object, the converging lens at the output of the illuminating beam path being identical to the converging lens at the input of the detecting beam path (confocal arrangement), and the object that is to be examined being arranged close to the common focal point of the illuminating beam path and the detecting beam path, characterised by:

a light source the divergent beam pencil of which has an elongate elliptical cross section, and an aligned large main axis of the elliptical beam pencil which enters the illuminating beam path in a direction in which the large main axis of the elliptical beam pencil that falls on the entry slit of the microspectrometer runs parallel to the longitudinal axis of the entry slit, and subassemblies that are permanently set with respect to one another, which are rigidly and durably joined together, comprising the illuminating device, the illuminating beam path, the detecting beam path and the microspectrometer with read-out unit.

The light source can be a conventional light source, or one of the known laser light sources. The radiation of the light source is collected at the input end focal point of the illuminating beam path.

The illuminating beam path comprises a converging lens at its input, optionally a band pass filter, a dichroic beam splitter and a converging lens at its output. With the band pass filter, a desired spectral range suitable for exciting the emission radiation from the object can be filtered out from the radiation from the light source.

The dichroic beam splitter is inclined relative to the optical axis of the illuminating beam path. The angle of inclination of the beam splitter towards the optical axis of the illuminating beam path may be from 30° to 60°. The optical axis of the detecting beam path is thus deflected through an angle of 60° to 120°, preferably 90°, out of the optical axis of the illuminating beam path.

The radiation of the light source is collected at the focal point of the illuminating beam path at the output end. The object to be examined is arranged in the area surrounding this focal point. The illuminating radiation excites emission radiation from the object.

The detecting beam path begins at the focal point of the illuminating beam path at the output end and passes through the converging lens at the output from the illuminating beam path. The emission radiation emanating from the object that is to be examined is deflected out of the illuminating beam path with the dichroic beam splitter.

An edge filter (long pass filter or short pass filter) is arranged in the detecting beam path. The position of the filter edge is matched to the wavelength of the emission radiation that is to be examined. The radiation emitted by the object that is to be examined is directed by means of a converging lens at the output from the detecting beam path on to the entry slit of the microspectrometer.

The input of the detecting beam path coincides with the output of the illuminating beam path from the confocal focal point to the dichroic beam splitter.

In the microspectrometer, the spectrum of the emission radiation of the object under investigation, passing through the entry slit, is produced. The microspectrometer preferably comprises a self-focusing corrected reflection grating with asymmetrical triangular furrows. The spectrum is preferably located on a line of diodes with which it is read out and evaluated.

If a thermal light source is used, a slit diaphragm with an elongate slit is located in the vicinity of the focal point of the illuminating beam path at the input end. The radiation from the thermal light source is focused on the slit in the slit diaphragm.

The slit diaphragm is located in or near the focal point of the converging lens of the illuminating beam path at the entry end. A beam pencil is thus formed, the cross-section of which is in the form of an elongate ellipse. The slit in the slit diaphragm may be from 10 to 100 microns wide and from 50 to 500 microns high. The cross-section of the light pencil emerging from the slit is in form of an elongate ellipse. The ratio of lengths of the two main axes of the ellipse may be from 2:1 to 10:1.

The diode laser light source used may be a diode edge emitter, preferably with a stabilised wavelength. A surface of the edge emitter emitting the illuminating radiation is arranged in the vicinity of the focal point of the illuminating beam path on the input side. The emitter surface may be 2 to 5 square microns in size. In this case there is need for neither a focusing device for the radiation emanating from the edge emitter nor a slit diaphragm. In one embodiment, the diode edge emitter has a substantially rectangular window; and in another embodiment, the diode edge emitter which has a substantially square window.

The edge emitter produces a divergent light pencil. The angles of divergence of the beam pencil are of different sizes in two directions of the cross-section of the beam pencil. As a result the beam pencil has an elongate elliptical cross-section. The ratio of length of the two main axes of the ellipse may be from 2:1 to 10:1. When an edge emitter is used as the light source no slit diaphragm is used.

In both light sources, the beam pencil entering the illuminating beam path has an elongate elliptical cross-section with which an elliptical spot of light is produced on the object under examination at the output from the illuminating beam path. The object emits radiation, the spectrum of which is to be investigated. The radiation emitted by the object has a different wavelength from the excitation radiation entering through the illuminating beam path. Some of this emitted radiation proceeds from the object under investigation towards the converging lens at the output from the detecting beam path. The beam pencil emitted also has an elongate elliptical cross-section. This beam pencil passes through the converging lens at the output from the illuminating beam path and falls onto the dichroic beam splitter which deflects the beam pencil emitted into the detecting beam path. By means of the converging lens at the output from the detecting beam path, the beam pencil of elliptical cross-section emitted by the object is directed onto the entry slit of the microspectrometer.

The large main axis of the elliptical cross-section of the beam pencil which falls on the entry slit of the microspectrometer runs parallel to the longitudinal axis of the entry slit. The entry slit of the microspectrometer is preferably illuminated completely and substantially uniformly over its entire surface. The elliptical cross-section of the beam pencil is preferably only slightly larger than the surface of the entry slit. Thus the beam of light of the emitted radiation which has entered the detecting beam path is retained substantially without any losses.

This condition is met if (during the assembling of the three components) the edge emitter or the slit diaphragm and hence the direction of the large main axis of the beam pencil of elliptical cross-section is aligned accordingly.

The converging lenses in the illuminating beam path and in the detecting beam path may be conventional refractive ground individual converging lenses or a conventional system of refractive ground lenses made of optical glass or plastics. Instead, defracted lenses (Fresnel zone plates) may also be used as converging lenses. In addition, glass rods with flat ground ends and a radial gradient in the refractive index (GRIN lenses) may be used as converging lenses. The typical diameter of the GRIN lenses is from 0.5 to 5 mm and the typical length is from 2 to 20 mm.

When the three components (lighting unit, illuminating beam path with detecting beam path, and microspectrometer with read-out unit) are assembled, they are optically adjusted and rigidly connected to one another.

The dichroic beam splitter may be made up of two 45° prisms. The dichroic splitting mirror is applied (for example by vapour deposition) to the inner surface of one of the prisms. The inner surfaces of the two prisms are located on one another. In addition, the dichroic beam splitter mirror may be applied to a transparent sheet which is located between the inner surfaces of the two prisms.

The dichroic beam splitter made up of two 45° prisms produces a very compact construction and makes it easy to assemble the optical system when using GRIN lenses and plate-shaped filters.

The microspectrometer has a self-focusing—and preferably corrected—reflection grating. The reflection grating has preferably triangular asymmetrical grooves. The entry slit of the Microspectrometer is in the focal point of the converging lens at the output from the detecting beam path or in the close vicinity of this focal point. The spectrum produced at the reflection grating preferably falls onto a line of diodes.

The illuminating pencil with the cross section of an elongate ellipse produces a light spot of elliptical cross-section on the object to be investigated at the focal point of the illuminating beam path at the output end. The beam pencil emitted by the object in this light spot also has an elliptical cross-section. This elliptical light spot is imaged via the detecting beam path on the entry slit of the microspectrometer. The large main axis of the elliptical cross-section of the beam pencil in the detecting beam path runs parallel to the longitudinal axis of the entry slit of the microspectrometer.

The entry slit of the microspectrometer is illuminated completely and substantially uniformly by the radiation that has been emitted by the object under investigation. The cross-sectional area of the beam pencil on the entry slit is only slightly larger than the area of the entry slit. The radiation emitted by the object under investigation, which is picked up by the converging lens at the input of the detecting beam path, is focused on the entry slit of the spectrometer with only a slight loss. The entry slit is fully illuminated.

The entry slit of the microspectrometer is typically 10 to 100 microns wide and 150 to 500 microns high.

The components of the miniaturized spectrometer comprise the illuminating unit, the optical parts for the illuminating beam path, the optical parts for the detecting beam path, the microspectrometer with concave reflection grating and with a preferably electronic read-out unit for the spectrum. These components are optically adjusted during assembly. They are rigidly and permanently fixed to one another. The miniaturized spectrometer is a "one-piece" apparatus, from the user's point of view. Typical external dimensions are 20 mm wide, 60 mm long and 10 mm thick.

The miniaturized spectrometer can preferably be used for examining an object which emits radiation of a different frequency under the effect of the incident exciting radiation, for example as Raman radiation or fluorescent radiation. It is particularly suitable for investigating low-light emission sources, for example for surface-enhanced Raman spectroscopy (SERS), preferably on microscopically small objects.

The miniaturized confocal spectrometer according to the invention has the following advantages:

- The beam pencil of elliptical cross-section entering the illuminating beam path from the light source falls completely on the object that is to be examined. The object emits a beam pencil of elliptical cross-section which illuminates the entry slit of the microspectrometer uniformly but has only low intensity adjacent to this entry slit.
- Only the emission radiation, according to spatial distribution and intensity, that is required to illuminate the entry slit of the microspectrometer is produced.
- The components rigidly joined together are optimally and permanently adjusted and durably fixed to one another.
- The optical sensitivity of the miniaturized spectrometer according to the invention is 10 to 100 times greater than the sensitivity of a fibre-based miniaturized spectrometer.
- The miniaturized spectrometer is mechanically and thermally robust in use on account of its quasi-monolithic structure.
- It is cheap to produce in large numbers and during manufacture can be designed to suit a particular intended use.
- Active-optical adjustment processes during assembly are avoided or require only a small amount of effort.
- The beam pencil of elliptical cross-section is directed onto the entry slit of the microspectrometer via the object that is to be examined, with low losses. The transfer losses that are unavoidable with fibre-based probes do not occur.
- The radiation losses of the radiation emitted by an object at the entry slit of the microspectrometer are low.
- The low-power illumination allows the known miniaturized spectrometers to be further miniaturized and produces a lower thermal loading on the object that is to be examined.
- Because of the short transmission distances the risk of parasitic spectra occurring is slight. These can form as a result of the interaction of the illuminating radiation with equipment (for example with an optical fibre).
- When a diode laser is used, in individual cases the filtering of the laser light in the illuminating beam path which is typically required can be omitted.
- It is particularly suitable for microanalysis on the spot, for example for point of care diagnosis.
- Objects of extremely small volume in the range of a few micro liters or objects of extremely small mass in the region of fragments of a milligram can be examined.
- The miniaturized spectrometer is suitable for the microspectral analysis of small amounts of substance and for the trace analysis of atoms or molecules which are present in very low concentration in an object.

The miniaturized spectrometer according to the invention is described more fully by means of the following drawings.

DETAILED DESCRIPTION OF THE INVENTION

Figure 1:
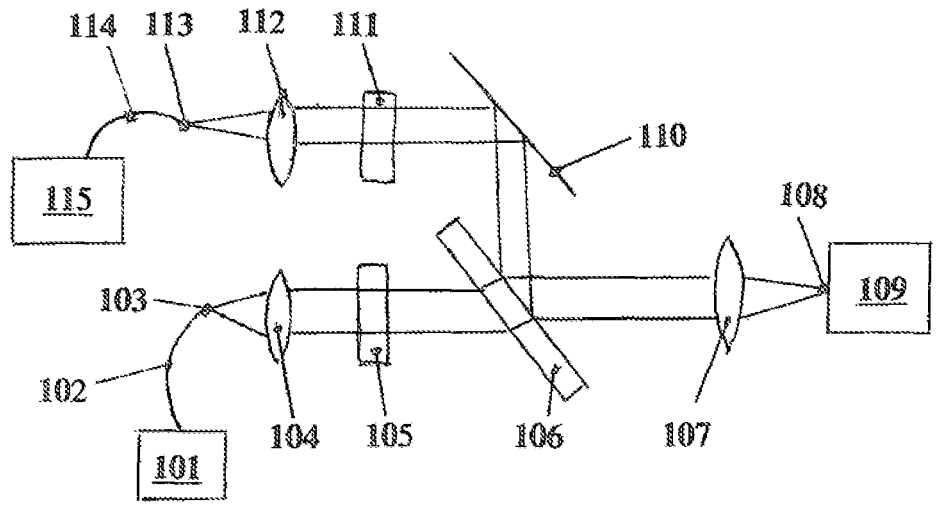
FIG. 1 shows a basic representation of a miniaturized spectrometer according to the prior art

FIG. 1 shows a basic representation of a miniaturized spectrometer according to the prior art. The radiation from the light source 101 is directed by the optical fibre 102 to the focal point 103 of the converging lens 104 of the illuminating beam path at the input end. A band pass filter 105 may be provided in the illuminating beam path. The light passes through the dichroic beam splitter 106, inclined towards the optical axis of the illuminating beam path, onto the converging lens 107 at the output from the illuminating beam path. The illuminating radiation is collected in the focal point 108 of the illuminating beam path at the output end. An object 109 which is to be examined is placed at this focal point.

The illuminating radiation is able to excite atoms or molecules in the object. The radiation emitted by the object, for example Raman scattered radiation or fluorescent radiation, is the detecting radiation. It emanates from the object at the confocal focal point 108 and passes into the detecting beam path. From the converging lens 107 at the input of the detecting beam path, the detecting radiation strikes the dichroic beam splitter 106. The beam splitter together with the deflecting mirror 110 deflects the detecting radiation. In the arrangement shown, the optical axis of the detecting beam path runs parallel to the optical axis of the illuminating beam path, for example.

Also mounted in the detecting beam path are an edge filter 111 and a converging lens 112 at the end of the detecting beam path. The converging lens 112 collects the emitted radiation at its focal point 113. From the focal point 113, the detecting radiation is directed by means of an optical fibre 114 to the entry slit of the spectrometer 115.

The illuminating beam path extends from the light source 101 to the confocal focal point 108. The detecting beam path extends from the confocal focal point 108 to the spectrometer 115.

Figure 2:
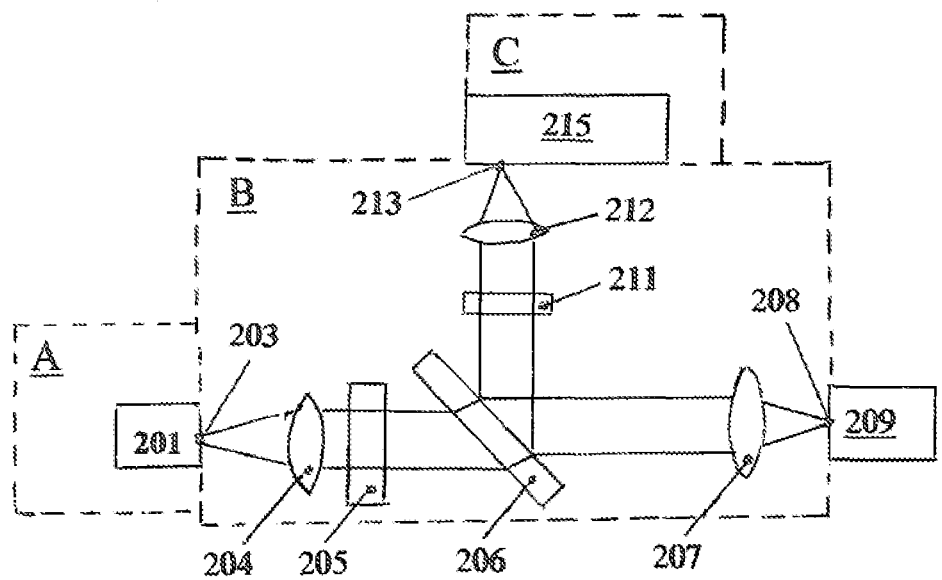
FIG. 2 shows an arrangement by way of example of the optical components of the miniaturized spectrometer according to the invention.

FIG. 2 shows an arrangement by way of example of the optical components of the miniaturized spectrometer according to the invention. The light of a thermal light source 201 is collected at the focal point 203 by means of a focusing device. A slit diaphragm is arranged at the focal point 203. The focal point 203 is also the focal point, on the input side, of the converging lens 204 at the entry to the illuminating beam path. A band pass filter 205 may be provided in the illuminating beam path. The illuminating radiation is directed to the converging lens 207 via the dichroic beam splitter 206. This converging lens collects the illuminating radiation at the focal point 208 of the illuminating beam path at the output end. Here, the object 209 that is to be examined is placed.

The radiation emitted by the object 209, for example Raman scattered radiation or fluorescent radiation, is the detecting radiation. It emanates from the object at the confocal focal point 208 and passes into the detecting beam path. From the converging lens 207 at the input of the detecting beam path, the detecting radiation strikes the dichroic beam splitter 206. The beam splitter deflects the detecting radiation out of the illuminating beam path. By means of an edge filter 211, the detecting radiation strikes the converging lens 212 at the output from the detecting beam path. This converging lens collects the detecting radiation at the focal point 213 where the entry slit of the microspectrometer 215 is located.

The components of the miniaturized spectrometer are the light source A, the illuminating beam path B and the microspectrometer C.

Instead of a thermal light source a laser diode may be used. Its exit window is arranged at the focal point 203. In this case, no slit diaphragm is needed.

Figure 3:
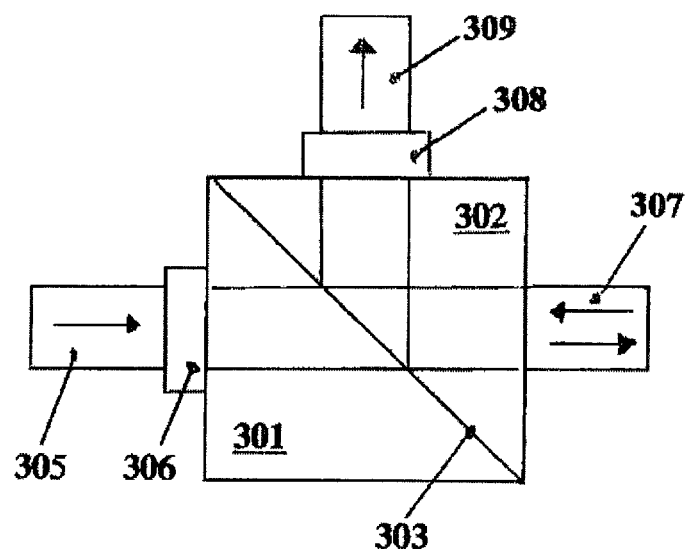
FIG. 3 shows an embodiment of a dichroic beam splitter 206.

FIG. 3 shows an embodiment of a dichroic beam splitter 206. This embodiment comprises two 45° prisms 301 and 302, the inner surfaces 303 of which are located on one another. Preferably, one of these surfaces carries an optically active coating. A GRIN-lens 305 and a band pass filter 306 are located at the entry into the illuminating beam path, in front of which is located the light source in assembly A. A GRIN-lens 307 forms the output of the illuminating beam path in front of which the object is located. At the inner surface 303 of the beam splitter the radiation emitted by the object is deflected into the detecting beam path. By means of the edge filter 308 and a GRIN-lens 309 the radiation emitted falls on the entry slit of the microspectrometer in component C.

Figure 4:
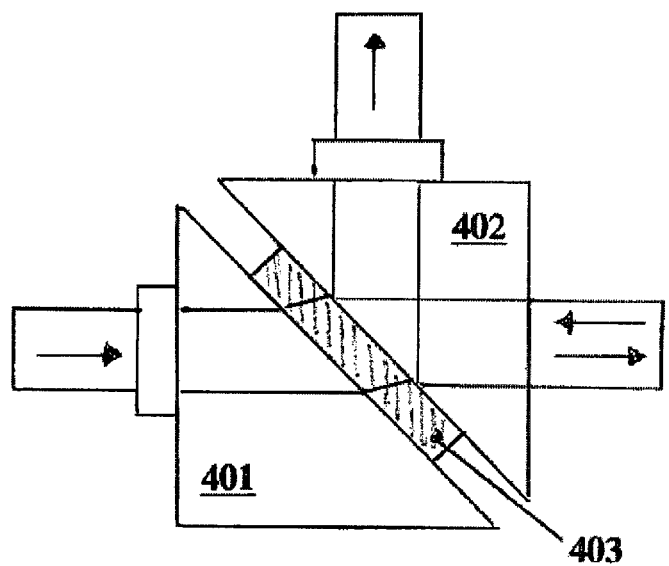
FIG. 4 shows another embodiment of the dichroic beam splitter.

FIG. 4 shows another embodiment of the dichroic beam splitter. Between the two 45° prisms 401 and 402 there is a plate 403 which has a dichroic layer on one of its surfaces.

The size of the figures gives no indication of the considerable differences in size between a miniaturized spectrometer according to the invention and a miniaturized spectrometer according to the prior art.

The invention claimed is:

1. A confocal spectrometer, comprising:
a first subassembly comprising an illuminating device having a light source emitting a beam having an elongate elliptical cross section;
a second subassembly comprising a confocal arrangement of first, second, and third converging lenses in which: (i) the first converging lens receives the beam from the light source and provides an incident elliptical beam to an input of an illumination beam path, (ii) the second converging lens is disposed at an output of, and receives the incident elliptical beam from, the illuminating beam path such that the incident elliptical beam irradiates an object under test, (iii) a dichroic beam splitter receives responsive radiation from the object in response to the incident elliptical beam, wherein the responsive radiation from the object enters the second converging lens at an input of a detecting beam path, wherein the responsive radiation is received by the dichroic beam splitter and is deflected toward an output of the detecting beam path, and wherein the object is arranged substantially close to a common focal point of the illuminating beam path and the detecting beam path; and (iv) the third converging lens is located at the output of the detecting beam path and receives the responsive radiation therefrom; and
a third subassembly comprising: (i) a microspectrometer having an entry slit receiving the responsive radiation from the third converging lens such that a large main axis of an elliptical beam of the responsive radiation runs parallel to a longitudinal axis of the entry slit, and (ii) a viewing device for providing a spectrum of the responsive radiation from the object,
wherein the first, second, and third subassemblies are permanently set with respect to one another and are rigidly and durably joined together.

2. The confocal spectrometer according to claim 1, wherein: the light source is a diode edge emitter that has a light emitting surface that is arranged in a vicinity of a focal point of the first converging lens at the input of the illuminating beam path.

3. The confocal spectrometer according to claim 2, wherein:
the light emitting surface of the edge emitter has an area of 2 to 5 square micrometers, and
a length ratio of the large main axis to a small main axis of the elliptical cross-section is from 2:1 to 10:1.

4. The confocal spectrometer according to claim 1, wherein:
the light source is a thermal light source, and
the illuminating device has a slit which is arranged in the vicinity of a focal point at the input of the illuminating beam path, and the thermal light source is focused on the slit.

5. The confocal spectrometer according to claim 4, wherein: the slit has a width of 10 to 100 microns and a height of 50 to 500 microns.

6. The confocal spectrometer according to claim 1, wherein a length ratio of the large main axis to a small main axis of the elliptical cross-section of the beam is from 2:1 to 10:1.

7. The confocal spectrometer according to claim 1, wherein a deflection angle between an optical axes of the illumination and detection beam paths at the dichroic beam splitter is from 60° to 120°.

8. The confocal spectrometer according to claim 1, wherein a band pass filter is arranged in the illuminating beam path.

9. The confocal spectrometer according to claim 1, wherein an edge filter is arranged in the detecting beam path.

10. The confocal spectrometer according to claim 1, wherein the first, second and third converging lenses are refractive lenses.

11. The confocal spectrometer according to claim 1, wherein the first, second, and third converging lenses are at least one of: defractive lenses, and Fresnel zone plates.

12. The confocal spectrometer according to claim 1, wherein the first, second, and third converging lenses are cylindrical and have a radial gradient of the refractive index.

13. The confocal spectrometer according to claim 1, wherein the dichroic beam splitter comprises two prisms being arranged in such a way that inner surfaces of the two prisms are located on one another, wherein one of the inner surfaces is partly reflective.

14. The confocal spectrometer according to claim 13, wherein the dichroic beam splitter mirror is applied to a transparent carrier plate located between the inner surfaces of the two prisms.

15. The confocal spectrometer according to claim 1, wherein the slit of the spectrometer is from 250 to 500 microns high and from 30 to 100 microns wide.

16. The confocal spectrometer according to claim 1, wherein the microspectrometer comprises a self-focusing reflection grating with triangular asymmetrical grooves.

17. The confocal spectrometer according to claim 1, wherein the microspectrometer comprises a detecting device for the spectrum of the responsive radiation from the object, the detecting device being a line of diodes with an electronic read-out device connected thereto.

18. The confocal spectrometer according to claim 7, wherein the deflection angle between the optical axes of the illumination and detection beam paths at the dichroic beam splitter is from 80° to 100°.

19. The confocal spectrometer according to claim 18, wherein the deflection angle between the optical axes of the illumination and detection beam paths at the dichroic beam splitter is 90°.

* * * * *